No. 865,065.
J. J. STURM.
HANDLE FOR BASKETS.
APPLICATION FILED NOV. 28, 1905.
PATENTED SEPT. 3, 1907.
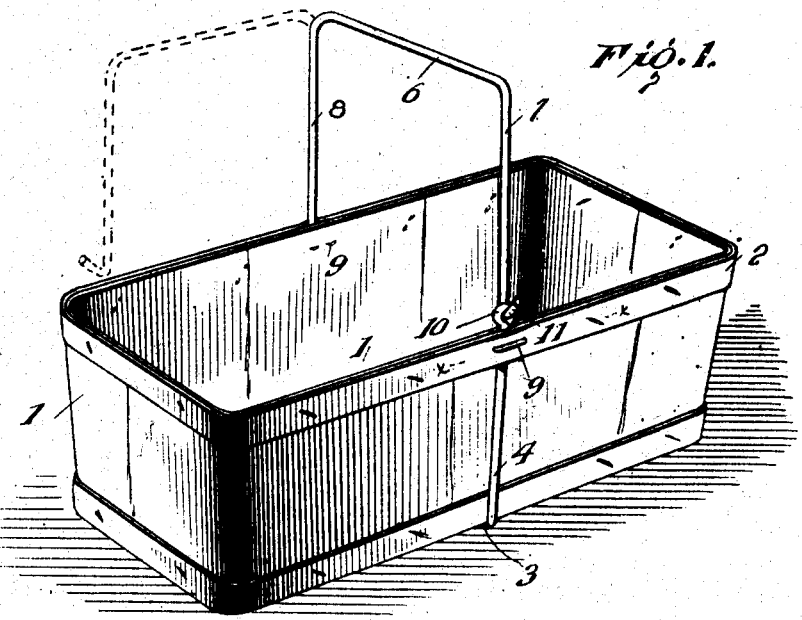
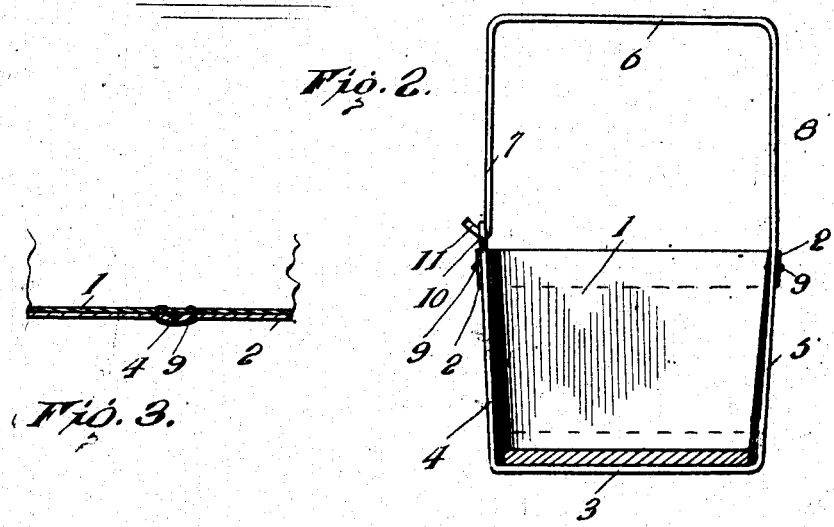
Inventor
J. J. Sturm

UNITED STATES PATENT OFFICE.

JOHN J. STURM, OF GLEN LORD, MICHIGAN.

HANDLE FOR BASKETS.

No. 865,065.　　　Specification of Letters Patent.　　　Patented Sept. 3, 1907.

Application filed November 28, 1906. Serial No. 289,511.

*To all whom it may concern:*

Be it known that I, JOHN J. STURM, a citizen of the United States, residing at Glen Lord, in the county of Berrien and State of Michigan, have invented certain new and useful Improvements in Handles for Baskets, of which the following is a specification.

Receptacles for fruit and the like, such as the ordinary splint baskets, are required to be provided with a handle for convenience of the customer in carrying. These handles as generally applied preclude the nesting of the baskets and as a consequence valuable space is required both in storing and transporting such receptacles in quantity. This difficulty has been overcome in part by shipping the baskets with the handle detached, thereby imposing upon the packer or user the work of attaching the handle, the same adding materially to the cost of packing.

The purpose of the present invention is to enable the baskets to be constructed complete at the factory with the handles attached in such a way as to permit the nesting of the baskets, said handles materially bracing and strengthening the baskets.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a basket embodying the invention, the dotted lines showing the handle attached at one side of the basket and turned so as to be out of the way and enable the nesting of a series of baskets; Fig. 2 is a vertical central transverse section thereof; and Fig. 3 is a horizontal section on the line *x—x* of Fig. 1 showing the manner of connecting a part of the handle to the basket.

Corresponding and like parts are referred to in the following description and indicated in all the views of the drawings by the same reference characters.

The basket 1 may be of any variety commonly employed for the reception of fruit and the like when packed for market. As shown the basket is of the type constructed of splints or wood veneers and is strengthened at its upper edge by a binder 2.

The handle is preferably constructed of wire and completely encircles the basket, i. e., it embraces the bottom and opposite sides and extends over the upper portion thereof.

The handle proper projects above the basket and is detachable or separable at one side to admit of its turning to one side as indicated by the dotted lines in Fig. 1, thereby permitting a series of baskets to be nested in the accustomed manner. The handle is constructed of a single length of wire which is bent so as to embrace the bottom and sides of the basket as shown at 3, 4 and 5, and is projected above the same as indicated at 6, 7 and 8. The lower portion embracing the bottom and sides of the basket may be designated as a brace or stay and the upper part as the handle.

For convenience of attaching the handle and stay to the basket the side portions are confined to the basket by the binder 2 and are further secured by means of a staple 9, the legs of which are passed through the binder and body of the basket upon opposite sides of the part of the handle confined by the binder and have their inner ends clenched as shown most clearly in Fig. 3.

The handle is detachably connected at one end to the stay to admit of turning the handle to one side as indicated by the dotted lines in Fig. 1 when it is required to nest a series of baskets. The joint between the loose end of the handle and the corresponding end of the stay may be formed in any manner and as shown an eye 10 is provided at one end and a hook 11 at the opposite end, the two being attached and interlocked in the well known manner. By preference the eye 10 is formed at the free end of the stay and the hook 11 at the loose end of the handle.

From the foregoing it will be understood that the basket may be completely formed at the factory with the handle attached, the detachable feature of the handle at one end admitting of the same being loosened and turned aside whereby a number of baskets may be nested so as to economize space as in shipping and storing. When the packer or user receives a consignment of baskets no appreciable time is lost or expense incurred in placing the handles in working position, as all that is required for this purpose is to turn the handle into operative position and slip the hook through the eye 10 which operation may be effected in an instant in the ordinary handling of the basket when packing and placing the cover in position. By having the handle at one side when received by the packer, the filling and the placing of the cover in position are more readily accomplished and as a matter of fact the work is facilitated rather than retarded.

Having thus described the invention, what is claimed as new is:

1. In combination with a basket or like receptacle bracing and carrying means therefor consisting of a single wire having an end portion forming a stay and embracing the bottom and opposite sides of the receptacle and secured thereto, and having the opposite end portion constituting a handle which at all times projects above the receptacle and is adapted to occupy a position either at one side or across the receptacle, one side member of the device occupying a fixed position and the other side member thereof being separable about in the plane of the top of the receptacle.

2. In combination with a basket or like receptacle, a combined stay and handle therefor formed of a single length of wire, the stay embracing the bottom and opposite sides of the receptacle and secured thereto, the handle projecting above the receptacle and adapted to occupy a position either at one side thereof or to extend thereover, the handle being separable from and adapted to make positive connection with the stay at one side of the receptacle and about in the plane of the top thereof, the opposite side member of the device being common to and integral with the stay and handle and adapted to be subjected to torsional strain when the handle is turned to occupy a position in the plane of a side of the receptacle.

3. In combination, a basket or like receptacle, a wire encircling the bottom and opposite sides of the receptacle and secured thereto, an end of the wire terminating about at the top of a side of the basket in an engaging element, the opposite end portion of the wire projecting above the opposite side of the basket to form a handle and terminating in an engaging element to make detachable connection with the opposite end of the wire to admit of the handle extending across the basket or occupying a position at one side thereof, the continuous member of the wire at one side of the basket being free to adapt itself to torsional strain throughout its length when turning the handle to occupy a position at one side of the basket.

In testimony whereof I affix my signature in presence of two witnesses.

JOHN J. STURM.

Witnesses:
N. A. HAMILTON,
W. R. STEVENS.